(12) United States Patent
Ono et al.

(10) Patent No.: US 7,017,616 B2
(45) Date of Patent: Mar. 28, 2006

(54) REINFORCED HOSE

(75) Inventors: Mitsugu Ono, Aichi (JP); Satoshi Mizutani, Aichi (JP); Kenichiro Furui, Aichi (JP); Yuichiro Murakami, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/959,405

(22) Filed: Oct. 7, 2004

(65) Prior Publication Data

US 2005/0121095 A1    Jun. 9, 2005

(30) Foreign Application Priority Data

Oct. 10, 2003   (JP)   .......................... P2003-352509

(51) Int. Cl.
*F16L 11/08*   (2006.01)

(52) U.S. Cl. ...................... 138/126; 138/124; 138/137; 138/140; 428/36.2; 428/36.1

(58) Field of Classification Search ........ 138/123–127, 138/137, 141, 140; 428/36.1–36.3
See application file for complete search history.

(56) References Cited

U.S. PATENT DOCUMENTS

| | | | | |
|---|---|---|---|---|
| 3,750,712 A | * | 8/1973 | Brand ........................ | 138/124 |
| 4,111,237 A | * | 9/1978 | Mutzner et al. ............ | 138/125 |
| 4,668,318 A | | 5/1987 | Piccoli et al. ............... | 156/149 |
| 4,668,319 A | | 5/1987 | Piccoli ........................ | 156/149 |
| 5,445,191 A | * | 8/1995 | Green et al. ................ | 138/126 |
| 5,660,210 A | * | 8/1997 | Ikeda et al. ................. | 138/126 |
| 6,631,742 B1 | * | 10/2003 | Hagiwara et al. ........... | 138/126 |

FOREIGN PATENT DOCUMENTS

| | | |
|---|---|---|
| EP | 1 314 924 | 5/2003 |
| EP | 1 314 925 | 5/2003 |
| JP | B2-2692480 | 9/1997 |
| JP | B2-3003769 | 11/1999 |

* cited by examiner

*Primary Examiner*—Patrick Brinson
(74) *Attorney, Agent, or Firm*—Posz Law Group, PLC

(57) ABSTRACT

A brake hose has an inner rubber layer, an outer rubber layer, and at least two reinforcing layers provided between the inner rubber layer and the outer rubber layer. The reinforcing layers include an upper yarn layer, and a lower yarn layer. Polyester yarn having a tensile strength of not lower than 6.9 g per unit dtex and having a stretchability of 2.6±1.0% at 2.7 g load per unit dtex is used as lower yarn in the lower yarn layer. The braid angle of the lower yarn layer with respect to the axial direction of the hose is set at 59±2°.

11 Claims, 4 Drawing Sheets

FIG. 5

| | CONFIGURATION | | | | | | | | | | PERFORMANCE | |
|---|---|---|---|---|---|---|---|---|---|---|---|---|
| | UPPER YARN LAYER | | | | LOWER YARN LAYER | | | | INNER-TUBE RUBBER LAYER | | DURABILITY (TEN THOUSAND TIMES) | AMOUNT OF VOLUMETRIC EXPANSION (cm³/ft) |
| | FIBER MATERIAL | FIBER SIZE (dtex) | BRAIDING METHOD | BRAID ANGLE θ(°) | FIBER MATERIAL | FIBER SIZE (dtex) | BRAIDING METHOD | BRAID ANGLE θ(°) | MATERIAL | THICKNESS (mm) | | |
| EXAMPLE 1 | HIGH-MODULUS PET | 1670 | 24 CARRIERS OF THREE-STRAND YARN | 59 | HIGH-MODULUS PET | 1670 | 20 CARRIERS OF THREE-STRAND YARN | 59 | EPDM | 0.6 | 1200~2200 | 0.16 |
| EXAMPLE 2 | DITTO | DITTO | DITTO | DITTO | DITTO | 1100 | DITTO | DITTO | DITTO | DITTO | 800~1300 | 0.14 |
| COMPARATIVE EXAMPLE 1 | PET | DITTO | DITTO | 57 | PET | 1670 | DITTO | 55 | DITTO | 0.7 | 600~1300 | 0.25 |
| COMPARATIVE EXAMPLE 2 | PVA | 1330 | DITTO | 55 | HIGH-MODULUS PET | DITTO | 20 CARRIERS OF TWO-STRAND YARN | 56 | DITTO | DITTO | 200~400 | 0.18 |

REINFORCED HOSE

This application is based on Japanese Patent Application No. 2003-352509, which is incorporated herein by reference.

BACKGROUND OF THE INVENTION

1. Field of the Invention

The present invention relates to a reinforced hose having an inner rubber layer, an outer rubber layer, and at least two reinforcing layers including an upper yarn layer and a lower yarn layer.

2. Description of the Related Art

Of this type reinforced hoses, a hose shown in FIG. 7 is heretofore known as a brake hose used in a vehicle. FIG. 7 is a sectional view showing important part of the brake hose 100 according to the related art. The brake hose 100 is formed in such a manner that a plurality of rubber and fiber yarn layers are laminated because the brake hose 100 needs to have high pressure resistance to brake oil pressure. That is, the brake hose 100 is formed as a laminate which has: an inner rubber layer 102 for forming a flow path 101 in which brake oil flows; a lower yarn layer 104; an intermediate rubber layer 106; an upper yarn layer 108; and an outer rubber layer 110, In the brake hose 100, fluid pressure is transmitted from the inner rubber layer 102 to the lower yarn layer 104, the intermediate rubber layer 106 and the upper yarn layer 108 successively and transmitted to the outer rubber layer 110 finally. Constraint force which suppresses expansion against the pressure of pressure fluid is generated in the respective layers. On this occasion, large part of the constraint force depends on the lower yarn layer 104 and the upper yarn layer 108 because the respective rubber layers, that is, the inner rubber layer 102, the intermediate rubber layer 106 and the outer rubber layer 110 are so highly elastic that only small part of the constraint force is generated in the respective rubber layers. Therefore, to increase constraint force generated on the basis of reaction force caused by expansion of the lower yarn layer 104 and the upper yarn layer 108 is to improve expansion resistance of the brake hose 100, that is, to reduce the amount of volumetric expansion. To improve durability of the lower yarn layer 104 and the upper yarn layer 108 against repeated contraction and expansion is to improve durability of the brake hose 100 per se. However, fiber yarn having a high stretchability is excellent in durability but inferior in expansion resistance whereas fiber yarn having a low stretchability is excellent in expansion resistance but inferior in durability. That is, durability and expansion resistance are contrary to each other.

A technique using high-modulus polyester yarn (high-modulus PET yarn) in the lower yarn layer 104 to keep durability high and using inextensional vinylon yarn in the upper yarn layer 108 to reduce the amount of volumetric expansion is known as a technique for successfully combining durability and expansion resistance with each other (see Japanese Patent No. 2,692,480). A technique in which lower yarn constituted by fine fiber yarn is braided to form a thin and dense reinforcing layer to thereby attain improvement in durability and expansion resistance is also known (see Japanese Patent No. 3,003,769).

The demand for higher pressure resistance and higher expansion resistance, however, has increased recently with the advance of increase in pressure of a hydraulic device of a vehicle. sufficient characteristic has never been obtained by the aforementioned change in kind of yarn in the lower yarn layer 104 and the upper yarn layer 108.

SUMMARY OF THE INVENTION

Upon such circumstances, an object of the invention is to provide a brake hose in which both durability and expansion resistance (the amount of volumetric expansion) can be improved on the basis of examination of the braid angle of reinforcing yarn in each reinforcing layer.

To solve the aforementioned problem, the brake hose according to the invention is a reinforced hose having an inner rubber layer, an outer rubber layer, and at least two reinforcing layers provided between the inner rubber layer and the jacket layer, including a lower yarn layer formed on the inner rubber layer and an upper yarn layer formed outside of the lower yarn layer, wherein the lower yarn layer is braided from a reinforcing yarn at a braid angle $59\pm2°$ with respect to an axial direction of the hose, and the reinforcing yarn is made of polyester yarn having a tensile strength of not lower than 6.9 g per unit dtex and having a stretchability of $2.6\pm1.0\%$ at 2.7 g load per unit dtex.

In the reinforced hose according to the invention, fluid pressure is transmitted from the inner rubber layer to the reinforcing layers and further transmitted to the outer rubber layer. On this occasion, the reinforcing layers operate so that volumetric expansion is suppressed by resistance force which is generated when the reinforcing yarn is stretched in accordance with the change of the fluid pressure.

The polyester yarn having a tensile strength of not lower than 6.9 g per unit dtex and having a stretchability of $2.6\pm1.0\%$ at 2.7 g load per unit dtex can be used as the reinforcing yarn. The polyester yarn may comprise a high-modulus PET yarn having a tensile strength of not lower than 6.9 g per unit dtex and having a stretchability of $2.6\pm1.0\%$ at 2.7 g load per unit dtex. Thus, high durability and low volumetric expansion against repeated load can be combined successfully with each other. That is, because the high-modulus PET yarn is lower in expansion per predetermined load than ordinary PET yarn which has a tensile strength of not lower than 6.6 g per unit dtex and has a stretchability of $4.0\pm1.0\%$ at 2.7 g load per unit dtex, the amount of volumetric expansion can be reduced. In addition, because polyester yarn is used in place of vinylon yarn in the lower yarn layer (or the upper yarn layer), the reinforcing layers are also excellent in fatigue resistance. The term "unit dtex" used herein means the number of grams per 10,000 m of filament yarn.

As described above, the high-modulus PET yarn is higher in the function of suppressing the amount of volumetric expansion than the ordinary PET yarn. When the braid angle of the reinforcing yarn is set at $59\pm2°$, the amount of volumetric expansion can be suppressed more greatly. The reason why the amount of volumetric expansion can be reduced when the braid angle is set to be in the aforementioned range will be described. The reinforcing layers are formed in such a manner that the outer circumference of the inner rubber layer is wound with two kinds of reinforcing yarn rotating in clockwise and counterclockwise directions opposite to each other. The term "braid angle of reinforcing yarn" means an angle of inclination with respect to the axial direction of the hose. When the fluid pressure in the reinforced hose increases, force acts on the reinforcing yarn to stretch the reinforcing yarn. This force operates to expand the hose in the radial direction and stretch the hose in the axial direction. It is conceived that the amount of volumetric expansion of the reinforced hose will be minimized when the braid angle is equal to an angle of repose, that is, an angle of 54.44° because these parts of force reach a state of equilibrium. Accordingly, in the related-art reinforced hose, fiber is braided at an angle equal or close to the aforementioned repose angle.

The present inventor, however, has found that the amount of volumetric expansion of a reinforced hose having reinforcing layers made of high-modulus PET yarn and embedded between the inner rubber layer and the outer rubber layer can be reduced when the braid angle is set at 59±2°, especially preferably at 59±1° which is larger than the repose angle. That is, the braid angle at which the amount of volumetric expansion can be minimized is equal to the repose angle (54.44°) when examined geometrically, but is equal to 59±2° which is larger than the repose angle when actually applied to the reinforced hose. In consideration of this fact, the braid angle is set to be in the aforementioned range.

For example, the reinforcing layers are produced as follows. While an inner rubber layer is extrusion-molded from an inner-tube extrudate, reinforcing layers of reinforcing yarn are braided on the inner rubber layer by a braider. Further, an outer rubber layer is extrusion-molded on the reinforcing layers. The braid angle of each reinforcing layer can be set on the basis of the ratio of the speed of extruding the inner rubber layer to the rotational speed of the braider.

In a preferred embodiment, the thickness of the inner rubber layer is preferably set at 0.6±0.2 mm, especially preferably set at 0.6±0.1 mm. When the thickness of the inner rubber layer is set at a small value, the outer diameter of the inner rubber layer can beset at a small value. Accordingly, the reinforcing layers can be braided on the inner rubber layer densely and firmly though the amount of reinforcing yarn is small As a result, the slack or gap between pieces of reinforcing yarn can be reduced, so that the amount of volumetric expansion can be reduced. Although the function of reducing the amount of volumetric expansion becomes more intensive as the thickness of the inner rubber layer becomes smaller, the inner rubber layer can be hardly extrusion-molded or the pressure fluid may penetrate into the inner rubber layer if the thickness of the inner rubber layer is smaller than 0.4 mm. It is therefore preferable that the thickness of the inner rubber layer is not smaller than 0.4 mm.

In a preferred embodiment, the reinforcing yarn has a size of 1,100±100 dtex. In this case, each reinforcing layer with a small outer diameter can be formed so densely that the amount of volumetric expansion can be reduced.

BRIEF DESCRIPTION OF DRAWINGS

FIG. 5 is an explanatory view for explaining results of examination of the operation and effect of the brake hose;

DETAILED DESCRIPTION OF THE PREFERRED EMBODIMENTS

A preferred embodiment of the invention will be described below to make the aforementioned configuration and operation of the invention clearer.

(1) schematic structure of Brake Hose 10

Figure 1:
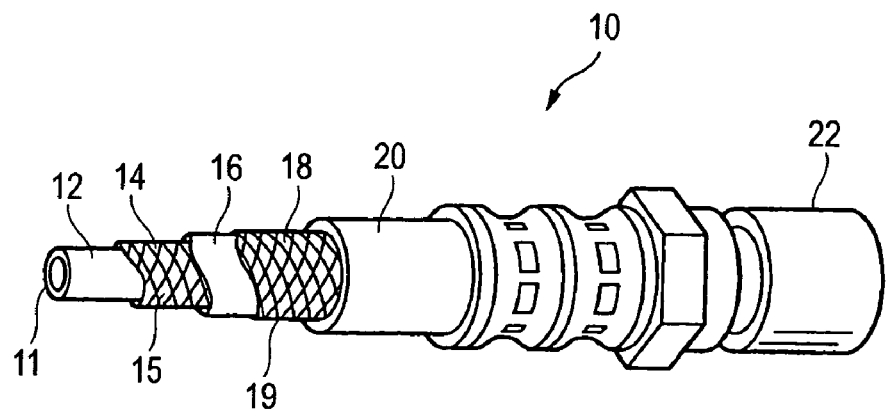
FIG. 1 is a partly cutaway perspective view of a brake hose according to an embodiment of the invention.
Figure 2:
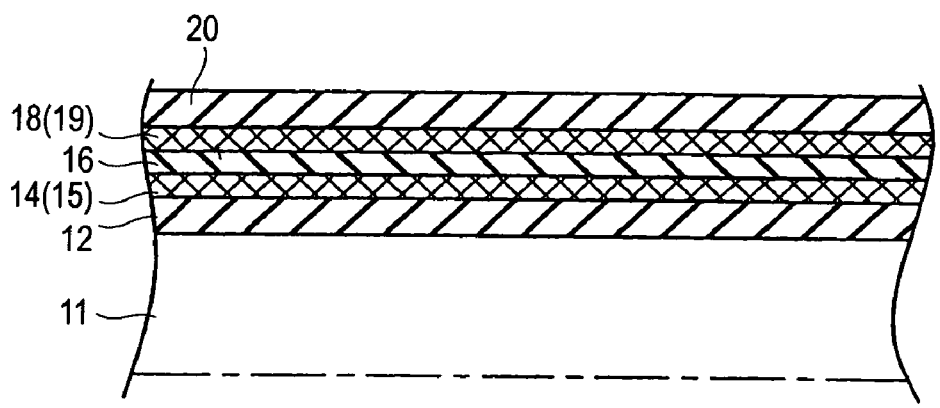
FIG. 2 is a half-sectional view of the brake hose.

FIG. 1 is a partly cutaway perspective view showing an embodiment in which are inforced hose according to the invention is applied to a brake hose 10. FIG. 2 is a half-sectional view of the brake hose 10. In FIGS. 1 and 2, the brake hose 10 is used so that a master cylinder used in a vehicle oil pressure brake not shown can be connected to a tire side hydraulic device by the brake hose 10. The brake hose 10 is formed as a laminate of five layers so that the brake hose 10 can bear the pressure of brake fluid. That is, the brake hose 10 has: an inner rubber layer 12 including a flow path 11; a lower yarn layer 14; an intermediate rubber layer 16; an upper yarn layer 18; and an outer rubber layer 20; wherein a mouse piece 22 is tightened to an end portion of the brake hose by caulking.

(2) Layer Configuration of Brake Hose 10

The materials, thicknesses, braid angles, etc. of the respective layers are decided so that the brake hose 10 can have characteristic such as pressure resistance, durability and expansion resistance to withstand maximum brake fluid pressure of 50 MPa.

(2)-1 Inner Rubber Layer 12

The inner rubber layer 12 is extrusion-molded from rubber such as etylene-propylene-diene terpolymer rubber (EPDM), isobutylene-isoprene copolymer rubber (IIR) or styrene-butadiene copolymer rubber (SBR) mainly to obtain oil resistance. When either EPDM or IIR or a blend of EPDM and IIR is used in this case, permeability to moisture can be improved on the basis of the solid-state properties of the inner rubber layer 12. The inner diameter of the inner rubber layer 12 is selected to be in a range of from 3.0 mm to 3.4 mm. The thickness of the inner rubber layer 12 is selected to be in a range of from 0.4 mm to 0.8 mm. When the inner rubber layer is thin, the inner rubber layer is effective in reducing the amount of volumetric expansion, If the inner rubber layer is thinner than 0.4 mm, there is however a possibility that the inner rubber layer will be hardly extrusion-molded or will be made permeable to pressure fluid. It is therefore preferable that the thickness of the inner rubber layer is not smaller than 0.4 mm.

(2)-2 Lower Yarn Layer 14

The lower yarn layer 14 is formed on the inner rubber layer 12 so as to be braided from 20 or 24 carriers of lower yarn 15 each made of two- or three-strand high-modulus PET yarn. Polyester yarn having a tensile strength of not lower than 6.9 g per unit dtex and having a stretchability of 2.6±1.0% at 2.7 g load per unit dtex is used as the high-modulus PET yarn. More preferably, polyester yarn having a tensile strength of not lower than 6.9 g per unit dtex and having a stretchability of 2.6±0.5% at 2.7 g load per unit dtex is used as the high-modulus PET yarn. The lower yarn 15 is formed as a bundle of 200 to 400 pieces of filament yarn. After the pieces of filament yarn are bundled, a primer coat layer is applied on the bundle. Then, an RFL process is carried out. In this manner, the lower yarn layer 14 is formed. The term "RFL process" used herein means a process in which an adhesive thin film serving as an adhesive agent and containing resorcin-formaldehyde-latex resin and rubber latex as main components is applied on a surface of yarn, Incidentally, the thickness of the lower yarn layer 14 is selected to be in a range of from 0.55 mm to 0.95 mm, preferably in a range of from 0.65 mm to 0.85 mm.

Figure 3:
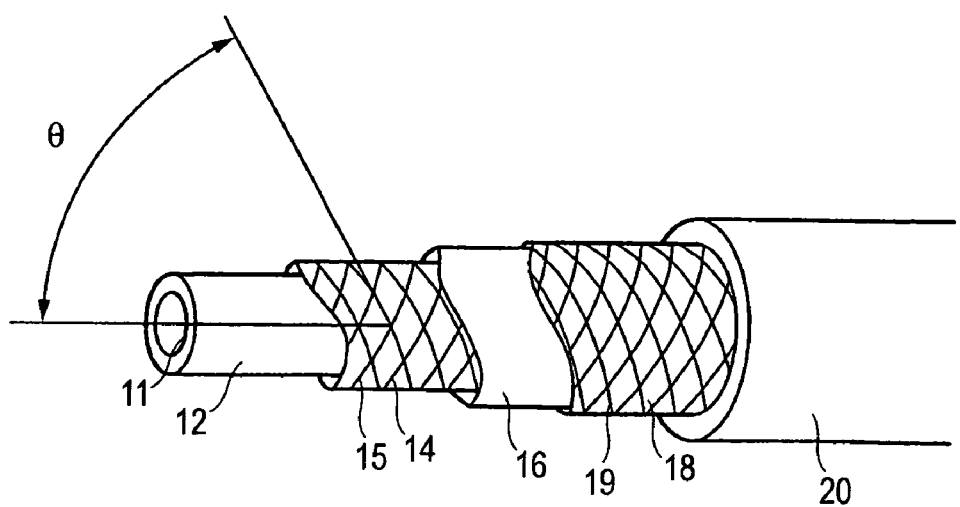
FIG. 3 is an explanatory view for explaining the braid angle of a lower yarn layer.

The braid angle of the lower yarn layer 14 is set at 59±2°, preferably 59±1° to reduce the amount of volumetric expansion. FIG. 3 is an explanatory view for explaining the braid angle of the lower yarn layer 14. As shown in FIG. 3, the lower yarn layer 14 is formed on the inner rubber layer 12 so as to be helically braided from the lower yarn 15 at a braid angle θ. The term "braid angle θ" used herein means an angle of the lower yarn 15 with respect to the axial direction of the hose. When, for example, the lower yarn layer 14 is braided on the inner rubber layer by a braider while the inner rubber layer is extrusion-molded, the braid angle θ can be changed on the basis of the ratio of the speed of extruding the inner rubber layer to the rotational speed of the braider.

(2)-3 Intermediate Rubber Layer 16

The intermediate rubber layer 16 is a layer for preventing the lower yarn layer 14 and the upper yarn layer 18 from being displaced. The intermediate rubber layer 16 is formed by a method such as a method of extruding a rubber material onto the lower yarn layer 14, a method of winding a sheet material 16A on the lower yarn layer 14 or a method of applying rubber paste on the lower yarn layer 14. EPDM, isobutylene-isoprene copolymer rubber (IIR) or natural rubber (NR) can be used as the rubber material. When either EPDM or ITR or a blend of EPDM and IIR is used as the rubber material in this case, heat resistance and moisture permeability can be improved on the basis of the solid-state properties of the rubber material. The thickness of the intermediate rubber layer 16 is preferably selected to be in a range of from 0.1 mm to 0.35 mm. The reason is as follows. If the intermediate rubber layer 16 is thinner than 0.1 mm, the intermediate rubber layer 16 is too thin to be formed on the lower yarn layer 14. On the other hand, if the intermediate rubber layer 16 is thicker than 0.35 mm, the function of suppressing the displacement of the lower yarn layer 14 is reduced because the thick intermediate rubber layer 16 serves as an elastic layer allowing the displacement of the lower yarn layer 14.

(2)-4 Upper Yarn Layer 18

The upper yarn layer 18 is formed in the same manner as the lower yarn layer 15. That is, 200 to 400 pieces of filament yarn are bundled to form high-modulus PET yarn. After an REL process, two or three pieces of high-modulus PET yarn are plied into upper yarn 19. 20 or 24 carriers of the upper yarn 19 are braided on the intermediate rubber layer 16. In this manner, the upper yarn layer 18 is formed. Like the braid angle of the lower yarn layer 14, the braid angle of the upper yarn layer 18 is preferably set at 59±2°, especially preferably at 59±1° which is larger than the repose angle, to reduce the amount of volumetric expansion.

(2)-5 Outer Rubber Layer 20

The outer rubber layer 20 is made of a material such as EPDM or a blend of EPDM and CR mainly to obtain ozone resistance. The thickness of the outer rubber layer 20 is selected to be in a range of from 0.8 mm to 1.3 mm.

(3) Method for Producing Brake Hose 10

A method for producing the brake hose 10 will be described below. The brake hose 10 can be produced by a commonly known method, that is, by a rubber extruding step, a fiber yarn braiding step and a vulcanizing step.

(3)-1 Hose Producing Apparatus 30

Figure 4:
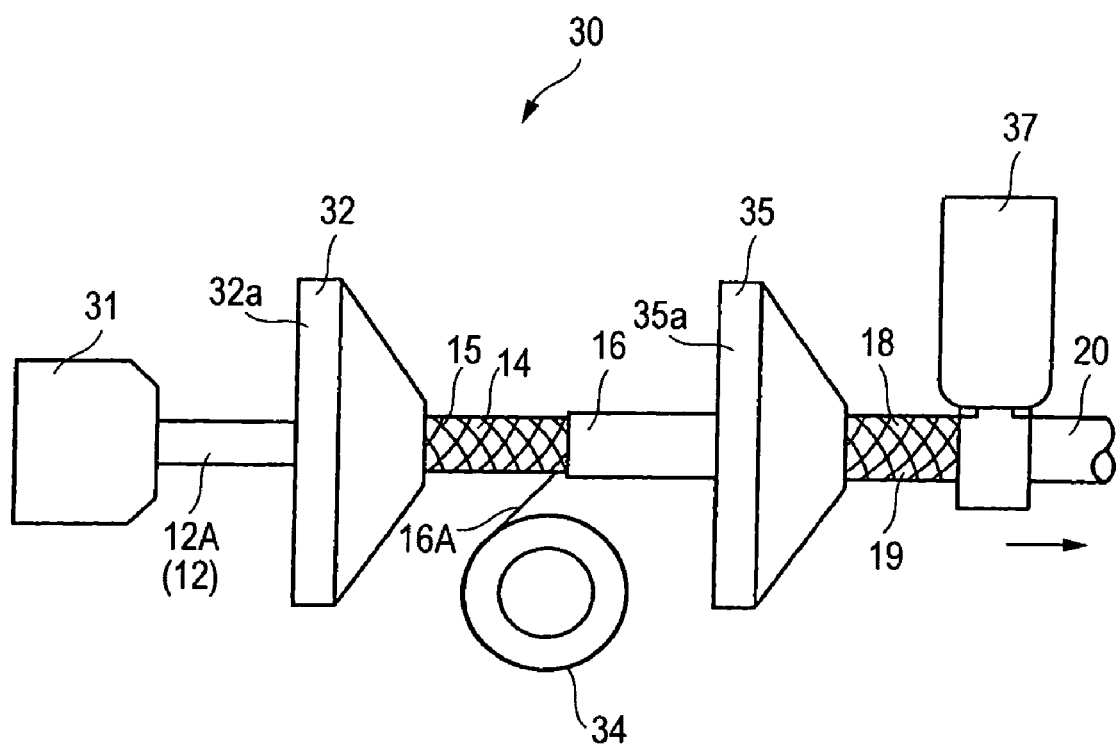
FIG. 4 is an explanatory view for explaining a hose producing apparatus.

FIG. 4 is an explanatory view for explaining a hose producing apparatus 30. In FIG. 4, the hose producing apparatus 30 has a first extruder 31, a first braider 32, an intermediate sheet former 34, a second braider 35, and a second extruder 37. The first extruder 31 is a device for extruding the rubber material to form the inner rubber layer 12. The first braider 32 is a device which has a bobbin carrier mounted in a drum 32a and which is provided for braiding the lower yarn 15 on the inner-tube extrudate 12A while feeding the lower yarn 15 out of the bobbin carrier to thereby form the lower yarn layer 14. The intermediate sheet former 34 is a device for feeding the sheet material 16A out of a roller to thereby form the intermediate rubber layer 16 on the lower yarn layer 14 braided by the first braider 32. The second braider 35 substantially has the same configuration as that of the first braider 32. That is, the second braider 35 is a device which has a bobbin carrier mounted in a drum 35a and which is provided for braiding the upper yarn 19 on the intermediate rubber layer 16 while feeding the upper yarn 19 out of the bobbin carrier to thereby form the upper yarn layer 18. The second extruder 37 is a device for extruding the rubber material to form the outer rubber layer 20.

(3)-2 Steps for Producing Brake Hose 10

A series of steps for producing the brake hose 10 by the hose producing apparatus 30 will be described below with reference to FIG. 3. First, the rubber material is extruded by the first extruder 31 to thereby form the inner rubber layer 12. On this occasion, a mandrel (not shown) is inserted in the inner rubber layer 12. Then, pieces of lower yarn 15 are fed out of bobbins onto the extruded inner rubber layer 12 while the drum 32a of the first braider 32 rotates, so that the lower yarn layer 14 is braided from the pieces of lower yarn 15 on the inner rubber layer 12. When, for example, the lower yarn layer 14 needs to be braided from 20 carriers of lower yarn 15 in this case, the 20 carriers of lower yarn 15 are fed out of twenty bobbins in twenty locations in total while the twenty bobbins rotate in reverse directions alternately. The braid angle θ of the lower yarn layer 14 can be set at 59±2° on the basis of the ratio of the speed of extruding the inner rubber layer 12 to the rotational speed of the drum 32a. Then, the intermediate sheet former 34 supplies the sheet material 16A onto the lower yarn layer 14 to thereby form the intermediate rubber layer 16. Further, while the drum 35a of the second braider 35 rotates, pieces of upper yarn 19 are fed out of bobbins onto the intermediate rubber layer 16 so that the upper yarn layer 18 is braided from the pieces of upper yarn 19 on the intermediate rubber layer 16. Then, the rubber material is extruded onto the upper yarn layer 18 by the second extruder 37 to thereby form the outer rubber layer 20.

Then, the vulcanizing step is carried out. A temperature of 120° C. to 170° C. and a time of 15 minutes to 60 minutes are set as a condition for the vulcanizing step. The upper yarn layer 18 and the lower yarn layer 14 subjected to the RFL process by heat generated in the vulcanizing step are bonded to the inner rubber layer 12, the intermediate rubber layer 16 and the outer rubber layer 20. In this manner, the brake hose 10 is formed integrally.

(4) Operation and Effect of Brake Hose (4)-1 Test of Brake Hose

Next, durability and expansion resistance (the amount of volumetric expansion) of the brake hose produced according to the aforementioned embodiment were examined. FIG. 5 shows the configuration and performance of a brake hose sample produced in each of Examples 1 and 2 and Comparative Examples 1 and 2. Each brake hose sample was produced to have an inner diameter of 3.1 mm to 3.2 mm and an outer diameter of 10.2 mm to 10.5 mm.

In each of Examples 1 and 2, the braid angle θ of the lower yarn layer was set at 59° while high-modulus PET yarn was used both in the upper yarn layer and in the lower yarn layer. The high-modulus PET yarn used in Example 1 has a size of 1670 dtex and has a tensile strength of not lower than 11.5 Kg for 1670 dtex and a stretchability of 2.6±1.0% at 4.5 Kg load for 1670 dtex. The high-modulus PET yarn used in Example 2 has a size of 1100 dtex smaller than the size of fiber yarn in Example 1 and has a tensile strength of not lower than 7.6 Kg for 1100 dtex and a stretchability of 2.6±1.0% at 3.0 Kg load for 1100 dtex. On the other hand, in each of Comparative Examples 1 and 2, the braid angle θ of the lower yarn layer was not larger than 56°. In Comparative Example 1, PET yarn was used both in the upper yarn layer and in the lower yarn layer. In Comparative Example 2, high-modulus PET yarn was used in the lower yarn layer while polyvinyl alcohol (PVA) yarn was used in the upper yarn layer. That is, Comparative Example 2 shows an example described in Japanese Patent No. 2692480.

(4)-1-1 Durability Test

The durability test was carried out as a repeated pressure test in which brake pressure oil was actually applied to the brake hose. That is, repeated pressurizing due to brake fluid pressure was combined with bumping and steering motion to imitate motion of tires in the condition that the brake hose was disposed in the same course as actually disposed in a vehicle. The brake fluid pressure was applied so that a pressure of 0 MPa and a pressure of 9.8 MPa were repeated alternately at 0.7 Hz. The bumping motion was repeated at 2.5 Hz. The bumping motion was repeated at 0.28 Hz. In this condition, the number of times of steering motion up to the breaking of the brake hose was examined. As a result, it was found that durability was not changed even in Examples in which high-modulus PET yarn was used both in the upper yarn layer and in the lower yarn layer while the braid angle was set to be larger than that in Comparative Examples.

(4)-1-2 Volumetric Expansion Test

The volumetric expansion test was carried out in such a manner that the amount of change in internal volume of the brake hose having a free length of 305 mm (1 foot) was measured under an oil pressure of 10.3 MPa in accordance with JIS-2601. It was found that the amount of volumetric expansion in each of Examples 1 and 2 was reduced compared with that in each of Comparative Examples 1 and 2.

(4)-2 Relation between Braid Angle θ and Volumetric Expansion

Figure 6:
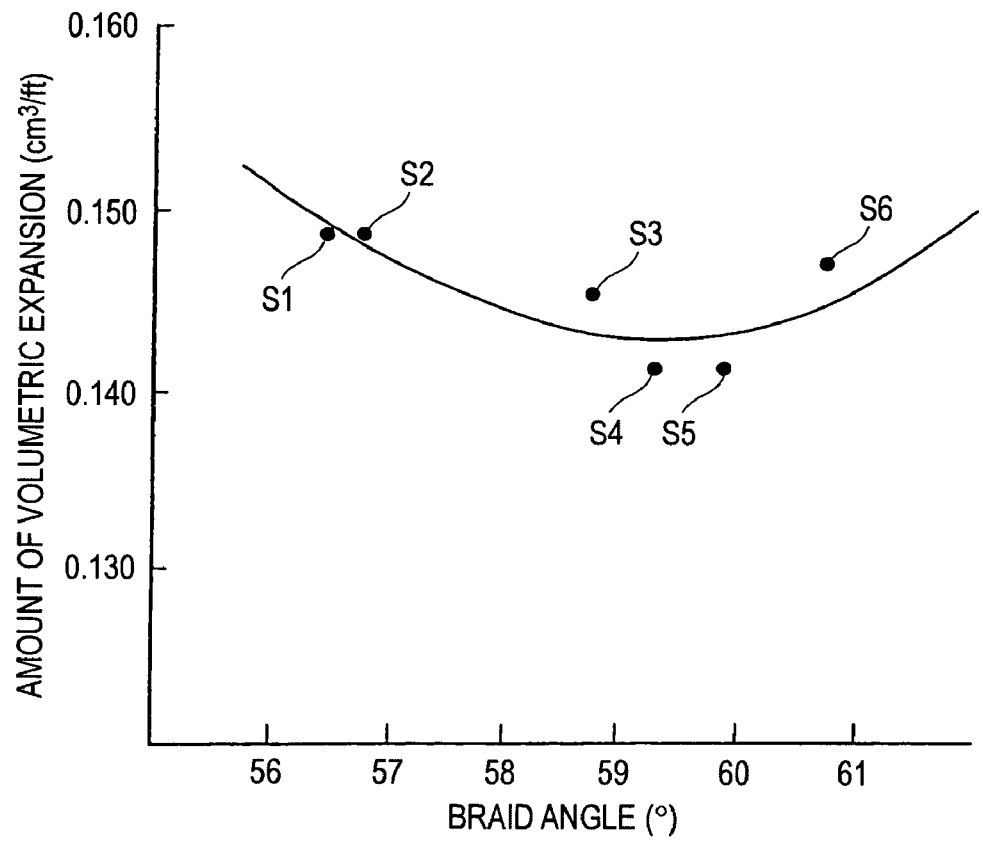
FIG. 6 is a graph for explaining the relation between the braid angle and the amount of volumetric expansion.
Figure 7:
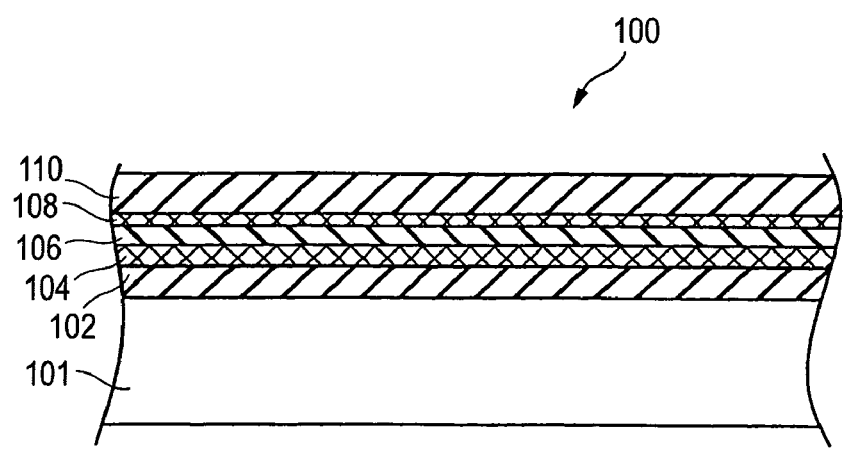
FIG. 7 is a sectional view showing important part of a brake hose according to the related art.

The relation between the braid angle θ and the amount of volumetric expansion was further examined. FIG. 6 is a graph showing the relation between the braid angle and the amount of volumetric expansion. The brake hose was produced to have an outer diameter of 10.2 mm while the braid angle θ of the upper yarn layer 18 was set at 59°. The braid angle θ was changed variously to prepare samples S1 to S6. The amount of volumetric expansion of each sample was measured. As a result, it was found that the amount of volumetric expansion decreased when the braid angle θ exceeded 57° as represented by the samples 53 to S6. It was also found that the amount of volumetric expansion increased when the braid angle θ exceeded 61°.

Incidentally, the invention is not limited to the aforementioned embodiment and various modifications may be made without departing from the gist of the invention. For example, the invention may be modified as follows.

Although the embodiment has shown the case where a brake hose is formed as the reinforced hose, the invention is not limited thereto but may be applied to a power steering hose of a vehicle or a hydraulic hose for building equipment as long as the hose is a high-pressure hose.

What is claimed is:

1. A reinforced hose comprising:
an inner rubber layer;
an outer rubber layer; and
at least two reinforcing layers provided between the inner rubber layer and the outer rubber layer, including a lower yarn layer formed on the inner rubber layer and an upper yarn layer formed outside of the lower yarn layer,
wherein the lower yarn layer is braided from a reinforcing yarn at a braid angle of 59±2° with respect to an axial direction of the hose, the reinforcing yarn being made of polyester yarn having a tensile strength of not lower than 6.9 g per unit dtex and having a stretchability of 2.6±1.0% at 2.7 g load per unit dtex;
wherein the upper yarn layer is braided from the reinforcing yarn at the braid angle of 59±2°, the braid angle being larger than a repose angle with respect to an axial direction of the hose; and
wherein the polyester yarn comprises a high-modulus PET yarn.

2. The reinforced hose according to claim 1, wherein the braid angle is set at 59±1°.

3. The reinforced hose according to claim 1, wherein the reinforcing yarn has a size of 1100±100 dtex.

4. The reinforced hose according to claim 1, wherein a thickness of the lower yarn layer is in a range of from 0.55 mm to 0.95 mm.

5. The reinforced hose according to claim 1, further comprising an intermediate rubber layer formed on the lower yarn layer.

6. The reinforced hose according to claim 5, wherein the intermediate layer has a thickness in a range of from 0.1 mm to 0.35 mm.

7. The reinforced hose according to claim 1, wherein the outer rubber layer is made of EPDM or a blend of EPDM and CR, and has a thickness in a range of from 0.8 mm to 1.3 mm.

8. The reinforced hose according to claim 1, wherein the inner rubber layer is made of EPDM, IIR, SBR, or a blend of EPDM and IIR, and has an inner diameter in a range of from 3.0 mm to 3.4 mm.

9. The reinforced hose according to claim 1, wherein the yarn has a stretchability of 2.6±0.5% at 2.7 g load per unit dtex.

10. The reinforced hose according to claim 1, further comprising an intermediate rubber layer disposed between the upper yarn layer and the lower yarn layer.

11. The reinforced hose according to claim 10, wherein the intermediate rubber layer is made of EPDM, IIR, or NR, and has a thickness in a range of from 0.1 mm to 0.35 mm.

* * * * *